(12) United States Patent
McDevitt

(10) Patent No.: US 9,539,578 B2
(45) Date of Patent: Jan. 10, 2017

(54) MAIN FRAME FOR MOBILE BULK PROCESSING APPARATUS

(71) Applicant: SANDVIK INTELECTUAL PROPERTY AB, Sandviken (SE)

(72) Inventor: Terry McDevitt, Ballybofey (IE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 14/911,471

(22) PCT Filed: Jun. 26, 2014

(86) PCT No.: PCT/EP2014/063530
§ 371 (c)(1),
(2) Date: Feb. 11, 2016

(87) PCT Pub. No.: WO2015/022112
PCT Pub. Date: Feb. 19, 2015

(65) Prior Publication Data
US 2016/0193611 A1    Jul. 7, 2016

(30) Foreign Application Priority Data

Aug. 14, 2013    (EP) ..................................... 13180383

(51) Int. Cl.
| | |
|---|---|
| *B65G 41/00* | (2006.01) |
| *B02C 21/02* | (2006.01) |
| *B07B 1/00* | (2006.01) |
| *B02C 23/08* | (2006.01) |

(52) U.S. Cl.
CPC ............. *B02C 21/026* (2013.01); *B02C 23/08* (2013.01); *B07B 1/005* (2013.01); *B65G 41/002* (2013.01); *B65G 41/005* (2013.01)

(58) Field of Classification Search
CPC ... B65G 41/006; B65G 41/002; B65G 41/005; B65G 41/008; B65G 67/04; B65G 13/12; B60P 3/1066
USPC ..... 198/312, 313, 861.5, 632; 414/523, 532, 414/534, 535; 241/101.75
See application file for complete search history.

(56) References Cited

U.S. PATENT DOCUMENTS

| | | | | |
|---|---|---|---|---|
| 3,485,304 | A | * | 12/1969 | Daymon ................ A01B 45/04 198/312 |
| 3,700,383 | A | * | 10/1972 | Boersma ................... B60P 1/36 198/312 |
| 4,372,725 | A | * | 2/1983 | Moore et al. ........ B65G 41/008 414/460 |
| 4,763,845 | A | * | 8/1988 | Guggenheimer ....... B02C 23/02 241/101.71 |

(Continued)

FOREIGN PATENT DOCUMENTS

| | | |
|---|---|---|
| EP | 0506812 B1 | 10/1997 |
| WO | 95/12462 A1 | 5/1995 |

(Continued)

*Primary Examiner* — James R Bidwell
(74) *Attorney, Agent, or Firm* — Corinne R. Gorski

(57) ABSTRACT

A mobile bulk material processing apparatus includes a main frame having a pair of opposed beams that are spaced apart in a widthwise direction across the apparatus. A conveyor transports material from or to a material processing unit mounted at the main frame. The beams are arranged to receive at least part of the conveyor to protect the conveyor in a raised transport position.

12 Claims, 9 Drawing Sheets

(56) References Cited

U.S. PATENT DOCUMENTS

| | | | | |
|---|---|---|---|---|
| 5,647,545 A | * | 7/1997 | Conner | B02C 21/02 241/101.75 |
| 2003/0146315 A1 | | 8/2003 | Boast | |
| 2013/0126648 A1 | | 5/2013 | Robinson et al. | |
| 2014/0048382 A1 | | 2/2014 | Horkko et al. | |

FOREIGN PATENT DOCUMENTS

| | | |
|---|---|---|
| WO | 97/41971 A1 | 11/1997 |
| WO | 02/26403 A1 | 4/2002 |
| WO | 2004/018106 A1 | 3/2004 |
| WO | 2005/099903 A1 | 10/2005 |

* cited by examiner

MAIN FRAME FOR MOBILE BULK PROCESSING APPARATUS

RELATED APPLICATION DATA

This application is a §371 National Stage Application of PCT International Application No. PCT/EP2014/063530 filed Jun. 26, 2014 claiming priority of EP Application No. 13180383.5, filed Aug. 14, 2013.

FIELD OF INVENTION

The present invention relates to mobile bulk material processing apparatus and in particular, although not exclusively, to mobile apparatus in which a main frame comprises a pair of opposed beams spaced apart to accommodate at least part of a conveyor when the apparatus is adapted for transportation.

BACKGROUND ART

Mobile bulk material processing apparatus has been developed for a wide variety of applications including the processing of stone, minerals, construction materials and both domestic and industrial waste to generate smaller and/or size categorised aggregate for subsequent processing, use or disposal. For example, in both a quarry or clearance site environment, a mobile crusher is used to crush stone, rubble or site clearance material into smaller pieces. Typically, the crusher is provided with a hopper for receiving the bulk material and a discharge conveyor to transfer the processed and crushed material to a discharge location.

Mobile screening plants also utilise hoppers and discharge conveyors and function to separate the bulk material into one or more screened sized ranges e.g. sand, ballast and aggregate via a screen box unit. Both screening and crushing plants range in size to suit particular applications with smaller self-propelled screening and/or crushing plants being designed to be readily transportable from one site to another on for example a low loader or by being towed as a trailed vehicle. It is accordingly desirable for such processing plants to comprise operating components that can be readily adjusted between an operative (e.g. crushing or screening) mode and a transport mode. Accordingly, a number of mobile processing plants have been proposed having moving components that can be easily adjusted between deployed and transport positions without interfering with one another both in use and during transportation.

Example transportable processing plants with folding or pivoting operative components are described in WO 95/12462; EP 0506812; WO 97/41971; WO 02/26403; WO 2004/018106 and WO 2005/099903.

For most mobile processing plants, the discharge conveyor is one of the primary components that is required to be adaptable between the operating and transport positions. When operative, it is desirable for the conveyor to extend as far as possible from the main body of the plant to provide remote stockpiling of the processed material to the side or to the ends of the plant and to collapse to a compact configuration during transport. Typically, the conveyor is folded at a head and tail section to minimise the distance by which the conveyor projects from the main or central part of the plant (that typically carries the endless tracks or wheels). WO 02/26403 is a typical example of a stowed folded conveyor adapted for transportation between sites. However, the conveyor of conventional plants is exposed during transportation and is commonly damaged by contact with objects that may be propelled upward from the road (such as tyre debris) or project into the road (such as trees or other encroaching structures like bridges, lights, signs and the like). There is therefore a need for a mobile processing plant that addresses these problems.

SUMMARY OF THE INVENTION

It is an objective of the present invention to provide a mobile bulk material processing plant, such as a mobile crusher or screener that is conveniently and quickly adaptable between an operative and a transport position to allow the plant to be transported between sites. It is a further specific objective to protect, as far as possible, selected operative components of the plant during transportation.

The objectives are achieved via a processing plant that comprises a main frame, at least a part of which comprises a pair of opposed beams or frame members that are spaced apart in a widthwise direction across the plant to accommodate at least part or all of a conveyor operative to transport material to or from the plant. The conveyor is mounted at the main frame via one or a plurality of couplings that manipulate and change the relative configuration of the conveyor between the operative and transport positions. Preferably, the plant comprises a primary pivot joint to allow the conveyor to slew laterally relative to the main frame. Preferably, the plant further comprises a plurality of additional pivot mountings that allow the conveyor to be raised and lowered relative to the main frame and in particular to position at least part of the conveyor between the opposed beams. This transport configuration provides protection for the conveyor from undesirable damage due to objects on the road and structures (or objects) that project into the road.

According to a first aspect of the present invention there is provided mobile bulk material processing apparatus comprising: a longitudinally extending main frame having a first end and a second end, a conveyor to transport material from or to a material processing unit mounted at the main frame, at least one coupling to mount the conveyor at the main frame for movement between a raised transport position and lowered operative position, characterised in that: the main frame towards the first end comprises a pair of opposed beams spaced apart such that at least a part of the conveyor may be accommodated between the beams in the raised transport position.

Preferably, the conveyor is a discharge conveyor to transport material from a processing unit of the apparatus to a remote discharge location.

Preferably, the main frame is formed by a pair of parallel longitudinally extending frame members that extend the full length or a majority of the length of the plant between the first and second ends. The pair of opposed beams may be regarded as a section of the opposed frame members. Alternatively, the opposed beams may be formed non-integrally with the main frame and may be attached or coupled to the main frame.

Preferably, the apparatus further comprises at least a pair of endless tracks or wheels mounted at a base region of the main frame to allow the apparatus to move over the ground.

Preferably, the frame comprises at least one neck section that extends upwardly from the base region, each of the opposed beams projecting from an uppermost part of the neck section. The neck section is advantageous to suspend or mount the opposed beams above the ground to provide adequate clearance below the beams to accommodate at least part of a conveyor. The neck section may comprise one or a plurality of straight inclined or upwardly curved sections that are formed integrally with each of the parallel frame members. Optionally, the neck section may be formed non-integrally with the frame members. Optionally, each of the opposed beams may be formed integrally with or alternatively may be attached to each respective neck section of each respective frame member.

Preferably, the apparatus further comprises at least one cross beam or brace extending between and linking the opposed beams in a widthwise direction of the apparatus. The cross beam is beneficial to stabilise the opposed frame beams and prevent undesirable twist or independent movement.

Preferably, the at least one coupling comprises a pivot joint to allow the conveyor to pivot relative to the main frame to change a position of a distal end of the conveyor relative to the main frame. The pivot joint is configured to provide slewing of the conveyor in a substantially horizontal plane below the opposed beams and above the underlying ground. That is, when the plant is arranged on level ground, an axis of the pivot joint is aligned substantially vertically. Preferably, the pivot joint is mounted and suspended below the opposed beams. Preferably, the apparatus further comprises a first bracket to couple the pivot joint to the main frame and a second bracket to couple the pivot joint to the conveyor such that the second bracket is configured to pivot relative to the first bracket. Preferably, the first and second brackets are mountable together via an intermediate slew ring or turntable. Such an arrangement is convenient to suspend the conveyor from the opposed beams and to allow 180° slewing movement without selected components interfering with one another both during operation and adjustment between the operative and transport positions.

Preferably, the conveyor comprises a head and tail section pivotally mounted together to allow the head section to bend or fold relative to the tail section to raise and lower a distal end of the conveyor relative to the opposed beams. Preferably, the head section is positionable between the opposed means when the conveyor is raised to the transport position. A conveyor with a pivotally mounted head and tail section is advantageous to allow the distal end of the conveyor to be raised above the ground to a maximum height in an operative mode that in turn allows bulk stock piling of the processed material far away from the plant main frame and convenient adaptation to the transport position where the head section is installed between the opposed beams.

Preferably, the apparatus further comprises a plurality of power operated linear actuators to drive bending or folding of the head section relative to the tail section. Preferably, the apparatus comprises a first set of actuators operating and attached to the tail section and a further set of actuators operating and attached to the head section. This is advantageous to allow independent and/or combined raising and lowering movement of the head and tail sections.

Preferably, the conveyor comprises a support structure to mount an endless belt or carriage member configured to support and transport the material relative to the main frame, wherein the pivot joint is mounted between the belt or carriage member and the opposed beams in a substantially vertical direction. Preferably, a distal end of the conveyor is capable of projecting longitudinally from between the beams beyond the first end of the main frame. The present processing apparatus is therefore compatible to mount a plurality of different sized conveyors including particularly long conveyors that may comprise a substantially central folding section or pivoting joint such that all or at least a part of the head section may be accommodated between the opposed beams whilst a very end region of the head section is capable of extending forwardly from between the opposed beams.

Preferably, the apparatus further comprises a screening unit mounted at the main frame to process material and to feed at least some of the processed material to the conveyor. Optionally, the material processing unit comprises a crusher mounted at the base region of the main frame. Optionally, the crusher is a gyratory, impact, vibration or jaw crusher.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Figure 1:
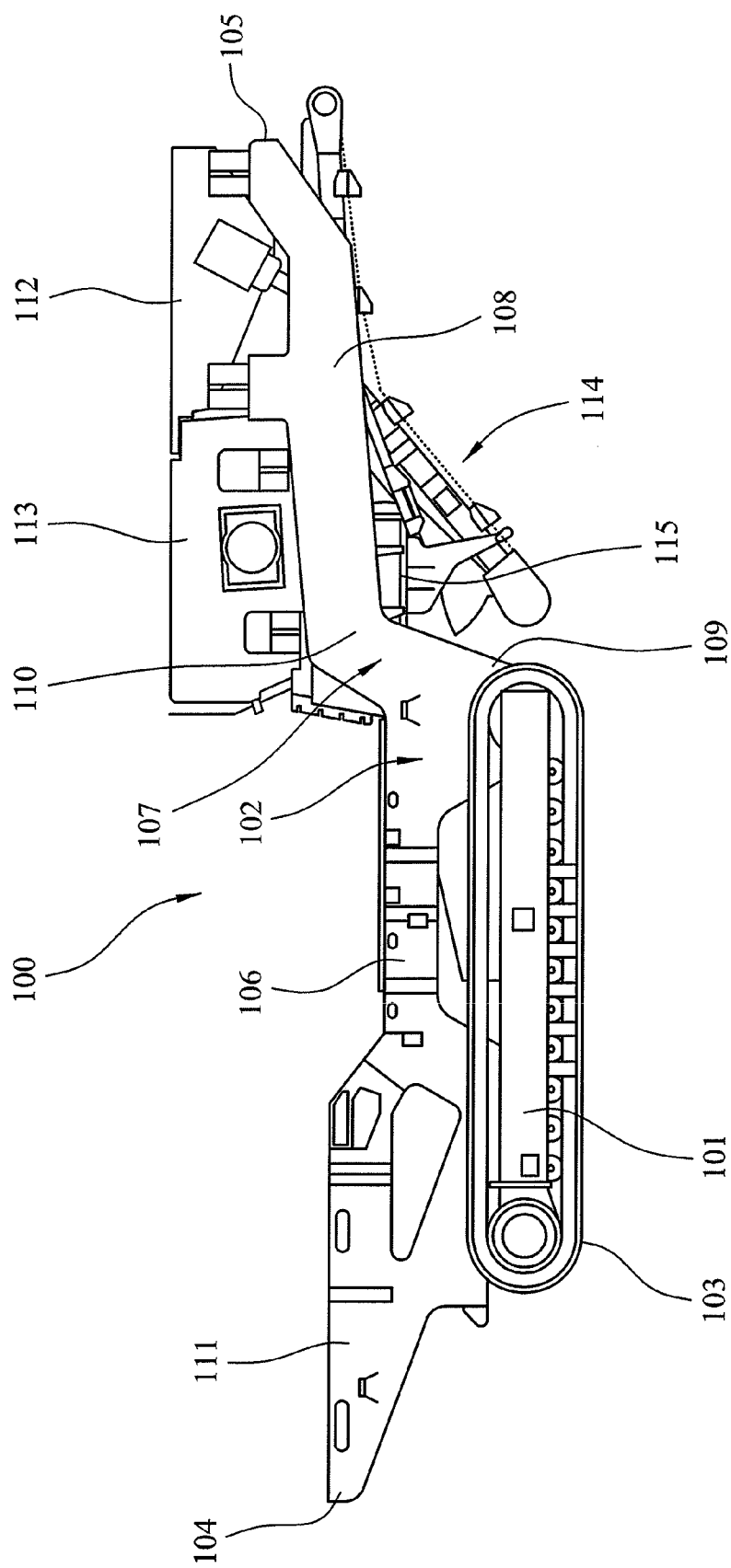
FIG. 1 is a side view of selected components of a mobile bulk material processing plant having a distribution conveyor suspended from below a region of a main frame (or chassis) according to a specific implementation of the present invention.
Figure 2:
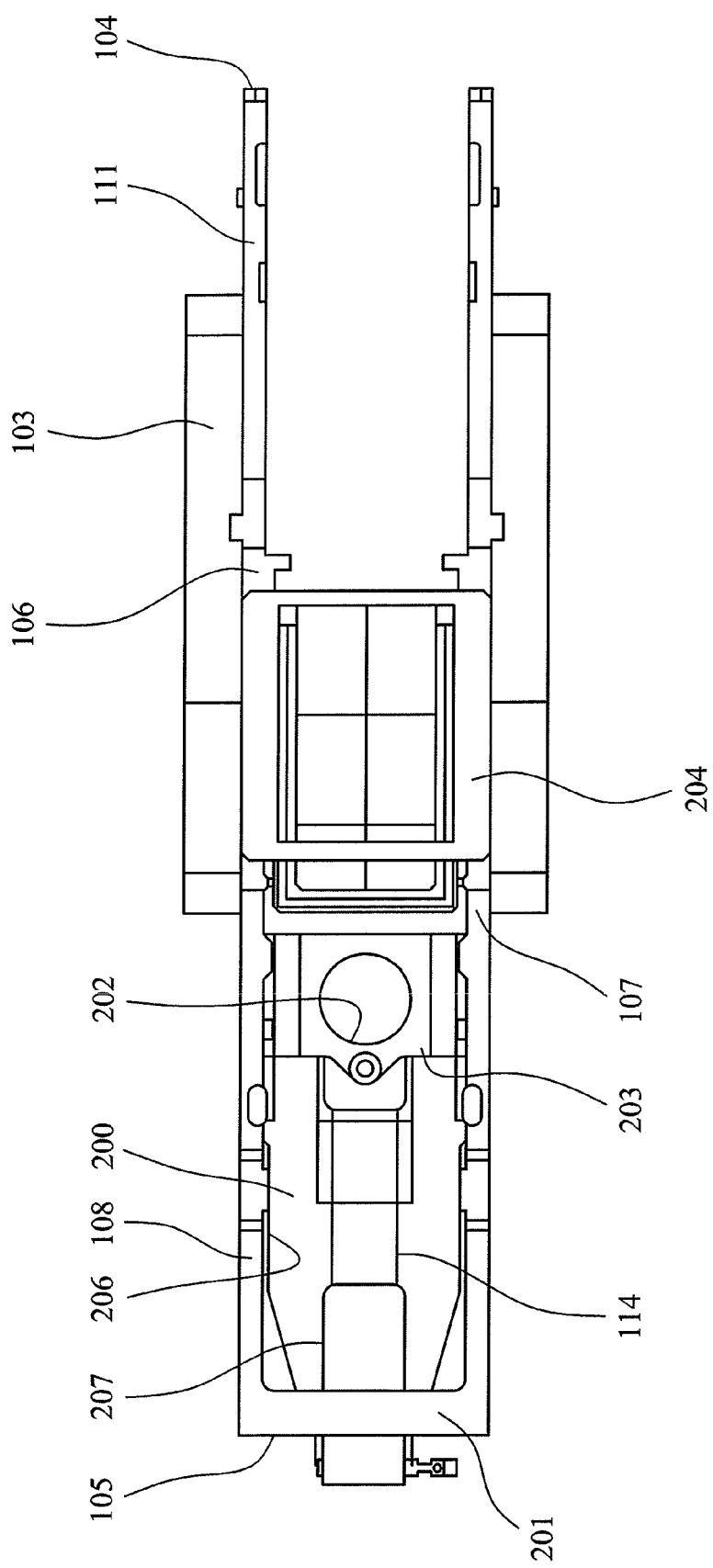
FIG. 2 is a plan view of the plant of FIG. 1 with selected components removed for illustrative purposes.
Figure 3:
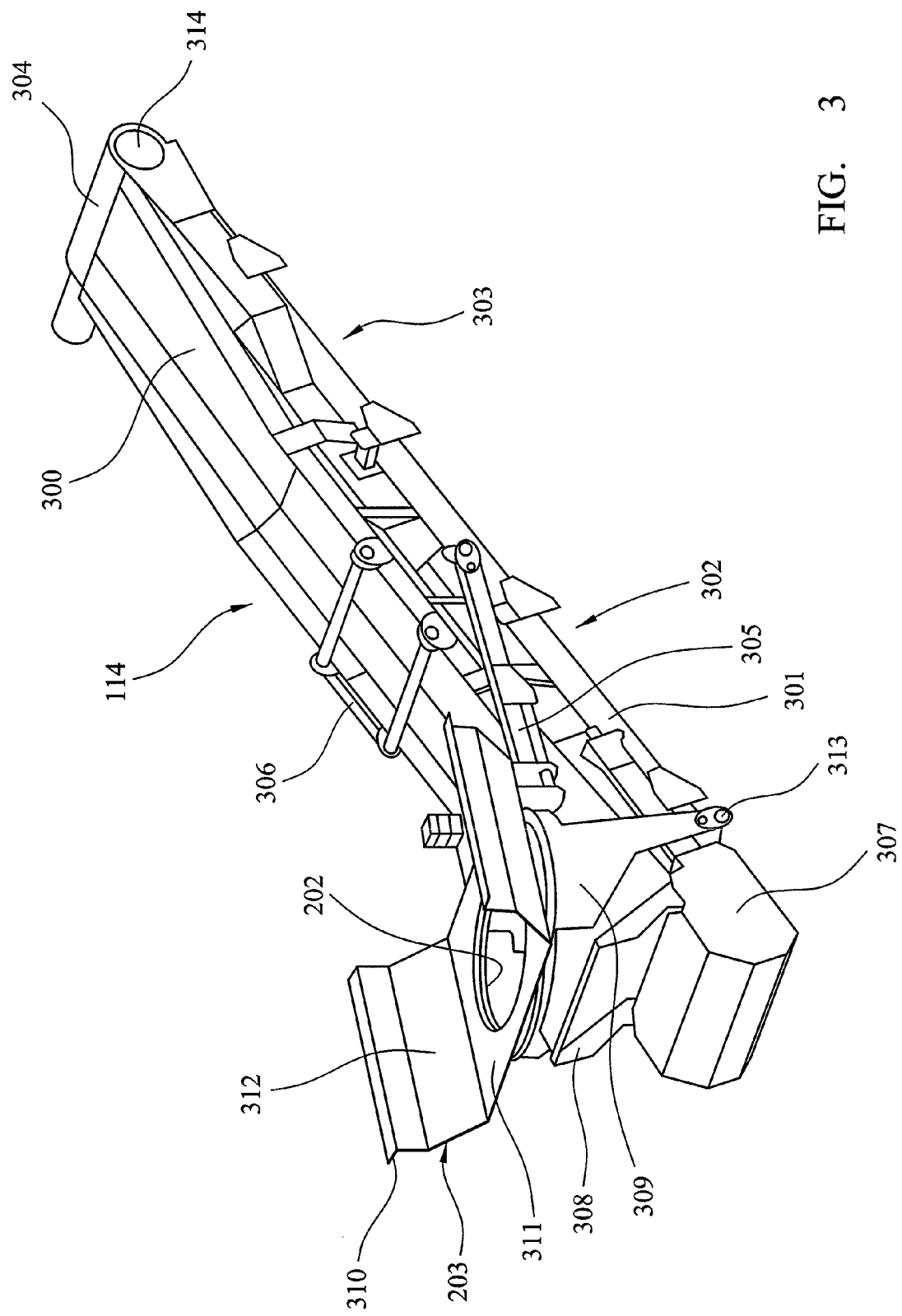
FIG. 3 is a perspective view of the discharge conveyor of the plant of FIG. 1 according to a specific implementation of the present invention.

Referring to FIGS. 1 and 2, a mobile processing plant 100 comprises a main frame (or chassis) 102 that provides a central support for the various operative components of the plant 100. Frame 102 is movably mounted on the ground via an undercarriage 101 that carries a pair of opposed endless tracks 103 that are driven by a suitable power unit (not shown) to propel plant 100 over the ground. Frame 102 comprises a pair of parallel and longitudinally extending frame members that extend from a forward end 105 to a rearward end 104. Each frame member is spaced apart in a widthwise direction perpendicular to the main length between ends 105, 104. A central frame region 106 provides support for a mount 204 to mount the power unit and a primary plant processing unit (not shown). As will be appreciated, the processing unit may comprise a crusher such as a gyratory, impact, vibration or jaw crusher. Alternatively or in addition, the main processing unit may comprise a screening unit or a series of screening units configured to separate bulk material into various size distributions. The crusher and/or screening unit is typically provided with a hopper (not shown) for receiving the bulk material from a supply conveyor (not shown) mounted at a rearward region 111 of frame 102 towards the second and rearward end 104.

A forwardmost region of frame 102 (being similar in construction and configuration to central and rearward regions 106, 111) comprises a pair of parallel longitudinally extending beam 108 spaced apart in the widthwise direction of plant 100. Accordingly, a space or gap 200 is created between the opposed inward facing surfaces 206 of beams 108. Beams 108 are structurally stabilised and supported by a cross beam 201 extending between the opposed faces 206 at the forward end 105. When plant 100 is positioned on level ground as shown in FIG. 1, beams 108 extend from central region 106 to be aligned almost horizontally above the ground. According to the specific implementation, beams 108 are inclined upwardly by a small angle from a neck region 107 of frame 102. Neck 107 extends upwardly from central region 106 and comprises a lower section 109 (provided that the transition or junction between neck 107 and central region 106) and a corresponding upper section 110 (provided at the transition or junction between neck 107 and beam 108). Accordingly, each longitudinally extending parallel frame member 102 comprises a respective neck region 107 such that each beam 108 is positioned vertically higher than central region 106 to be suspended above the ground and to provide adequate clearance at the region directly below beams 108 to accommodate a part of a discharge conveyor 114. Beams 108 provide a mount for a primary feeder unit 112 and a sieve or screener unit 113 that extend upwardly from beams 108 (and are removed from FIG. 2 for illustrative purposes).

Figure 4:
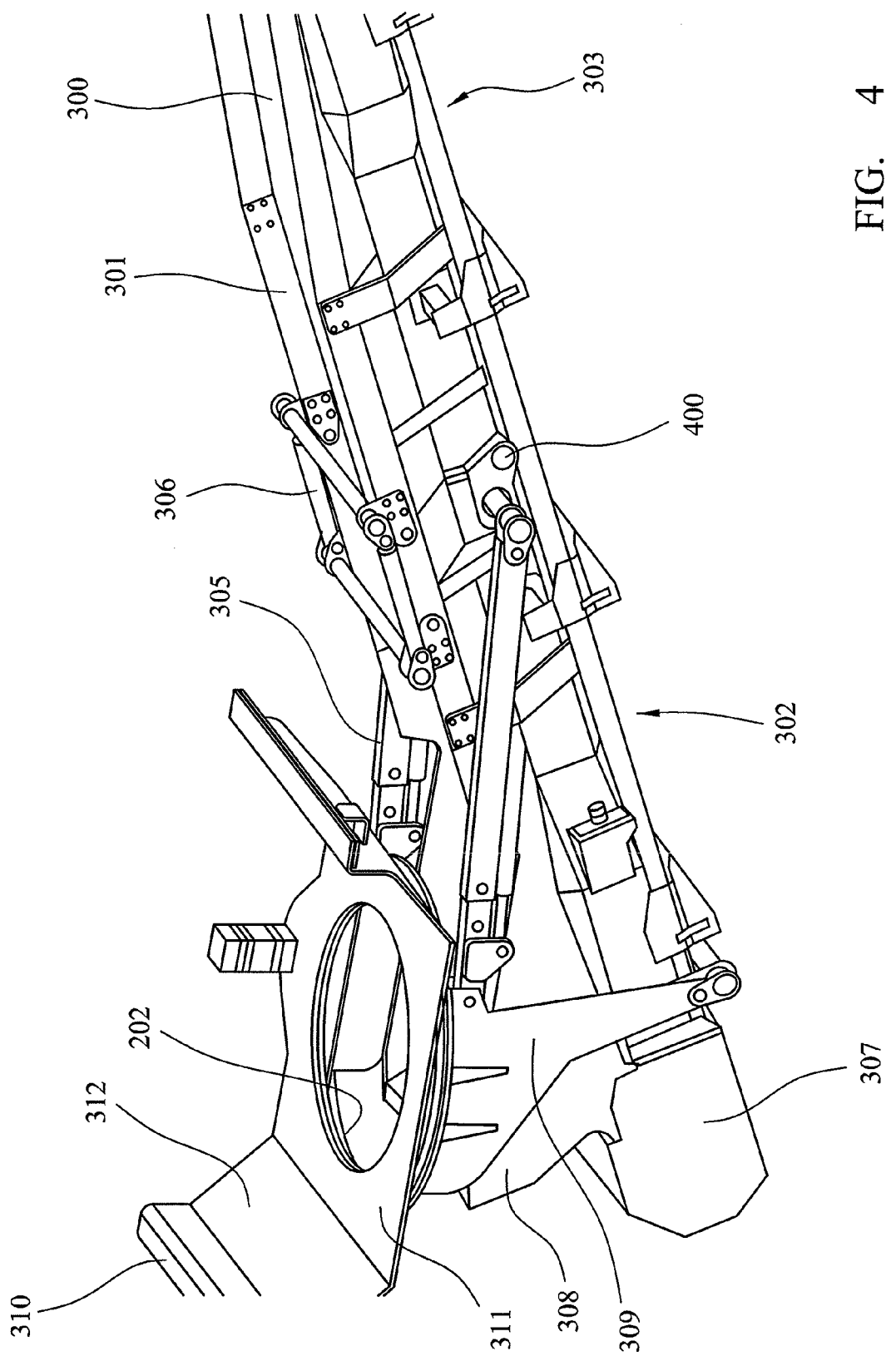
FIG. 4 is a magnified view of a lower region of the discharge conveyor of FIG. 3.

Conveyor 114 is mounted at and suspended below beams 108 via a pivot joint indicated generally by reference 115 that is coupled (via a first upper part) to beams 108 and (via a second lower part) to conveyor 114. Referring to FIG. 2, pivot joint 115 comprises a rotatable slew ring 202 rotatably mounted within a first bracket 203 that is coupled to beams 108. In particular, bracket 203 comprises a base plate 311 (that mounts slew ring 202) and a pair of opposed side walls 312 that project upwardly from each lateral side of base plate 311. Each side wall 312 is terminated at its uppermost end by an elongate runner 310 comprising a low friction liner. Accordingly, side walls 312 and runners 310 are positioned upwardly from slew ring 202. A second bracket 309 projects downwardly from base plate 311 and slew ring 202 and provides a support frame for conveyor 114. Accordingly, conveyor 114 is suspended from beams 108 via first and second brackets 203, 309. Second bracket 309 is attached via a pivot mounting 313 at a lowermost end of conveyor 114 furthest from an uppermost discharge distal end 304. Conveyor 114 further comprises a support frame structure 301 that carries an endless belt 300 drivable over a plurality of rollers 314 to carry and discharge material processed by unit 113. Support frame 301 is divided into a uppermost head section 303 and a lowermost tail section 302 pivotally coupled to one another via a pivot coupling 400 (illustrated in FIG. 4). A first pair of hydraulic actuators 305 extend between second bracket 309 and an uppermost end region of the tail section 302. A second pair of hydraulic actuators 306 are mounted between the support frame 301 of the head 303 and tail 302 sections at the region of pivot coupling 400. Accordingly, tail section 302 is capable of being displaced and effectively raised and lowered relative to second bracket 309 via actuators 305 whilst head section 303 may be raised and lowered relative to tail section 302 via actuators 306. In particular, pivot coupling 400 and pivot mount 313 comprise respective pivot axes that are aligned substantially perpendicular to a pivot axis of the slewing coupling 115. This configuration provides the desired movement of the end region 304 of the conveyor in the vertical (raising and lowering) plane and the horizontal (slewing) plane. Conveyor 114 further comprises a guard 307 (to protect the lowermost end of conveyor frame 301) and a conveyor hopper 308 (to feed material from screener unit 113 onto belt 300). Conveyor 114 further comprises a guard 307 (to protect the lowermost end of conveyor frame 301) and a conveyor hopper 308 (to feed material from screener unit 113 onto belt 300).

Figure 5:
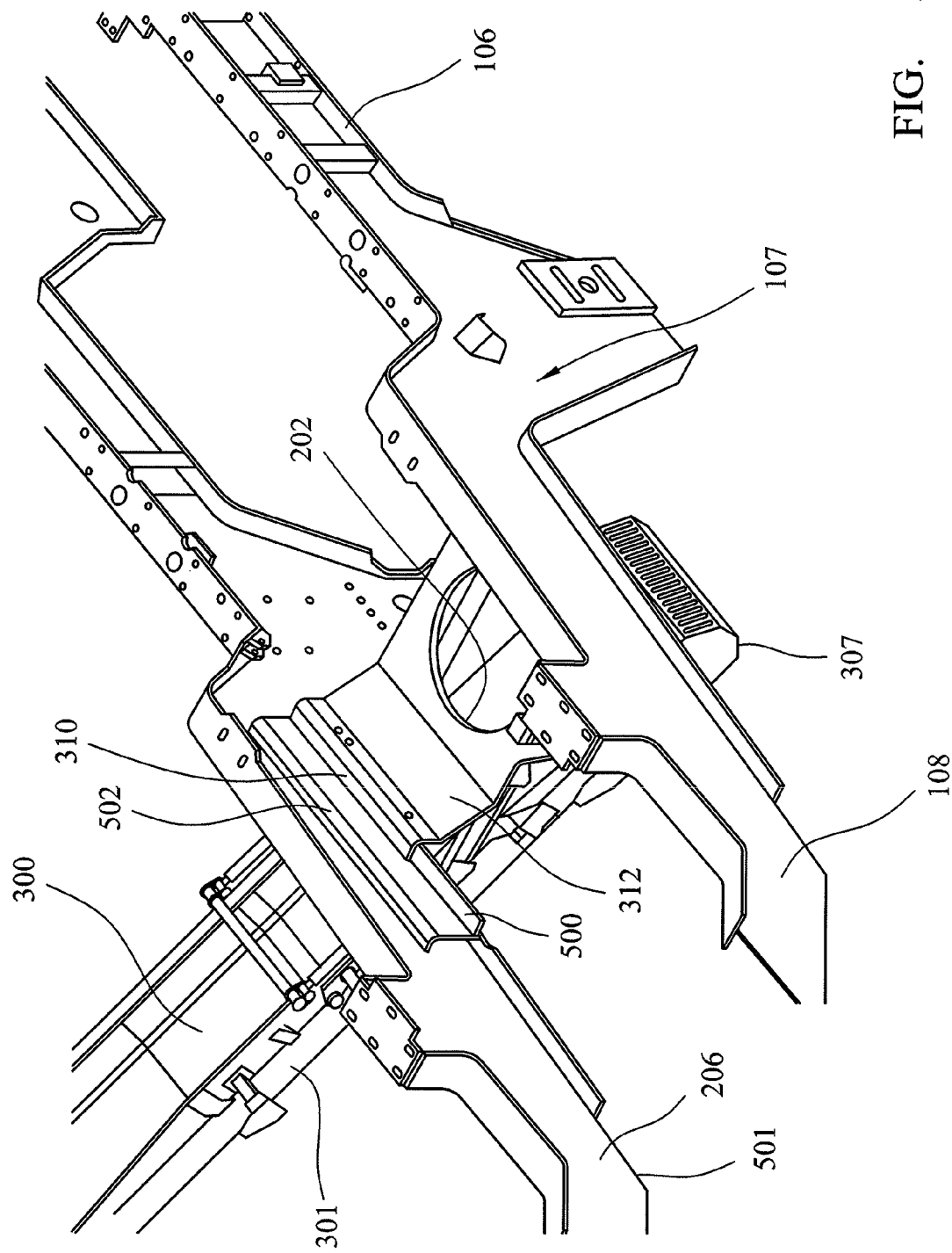
FIG. 5 is a perspective view of the discharge conveyor of FIG. 3 mounted at the main frame via a pivot joint and a separate linear coupling according to a specific implementation of the present invention.

Referring to FIG. 5 and as illustrated in FIG. 1, conveyor 114 is suspended below beams 108 that represent a conveyor support region of plant main frame 102. That is, first bracket 203 is coupled to each inward facing surfaces 206 of beams 108 such that runners 310 sit between beams 108 within space 200. Accordingly, bracket side walls 312 project downwardly from beams 108 to suspend base plate 311 vertically below beams 108. Accordingly, slew ring 202 is suspended below a lowermost downward facing surface 501 of beams 108. A linear coupling, in the form of a pair of elongate members 502 are respectively secured to the inward facing surface 206 of each beam 108. Each linear member 502 comprises a longitudinally extending rail 500 that projects inwardly into space 200 between the inward facing surfaces 206. Runners 310 are configured to sit on top of each respective rail 500 such that the low friction runners 310 can slide along each rail 500 to allow bracket 203 (an in particular slew ring 202) to slide longitudinally along beams 108 towards and away from frame central region 106. This sliding action is driven by one or a plurality of power operated linear actuators or rams (not shown).

Figure 6:
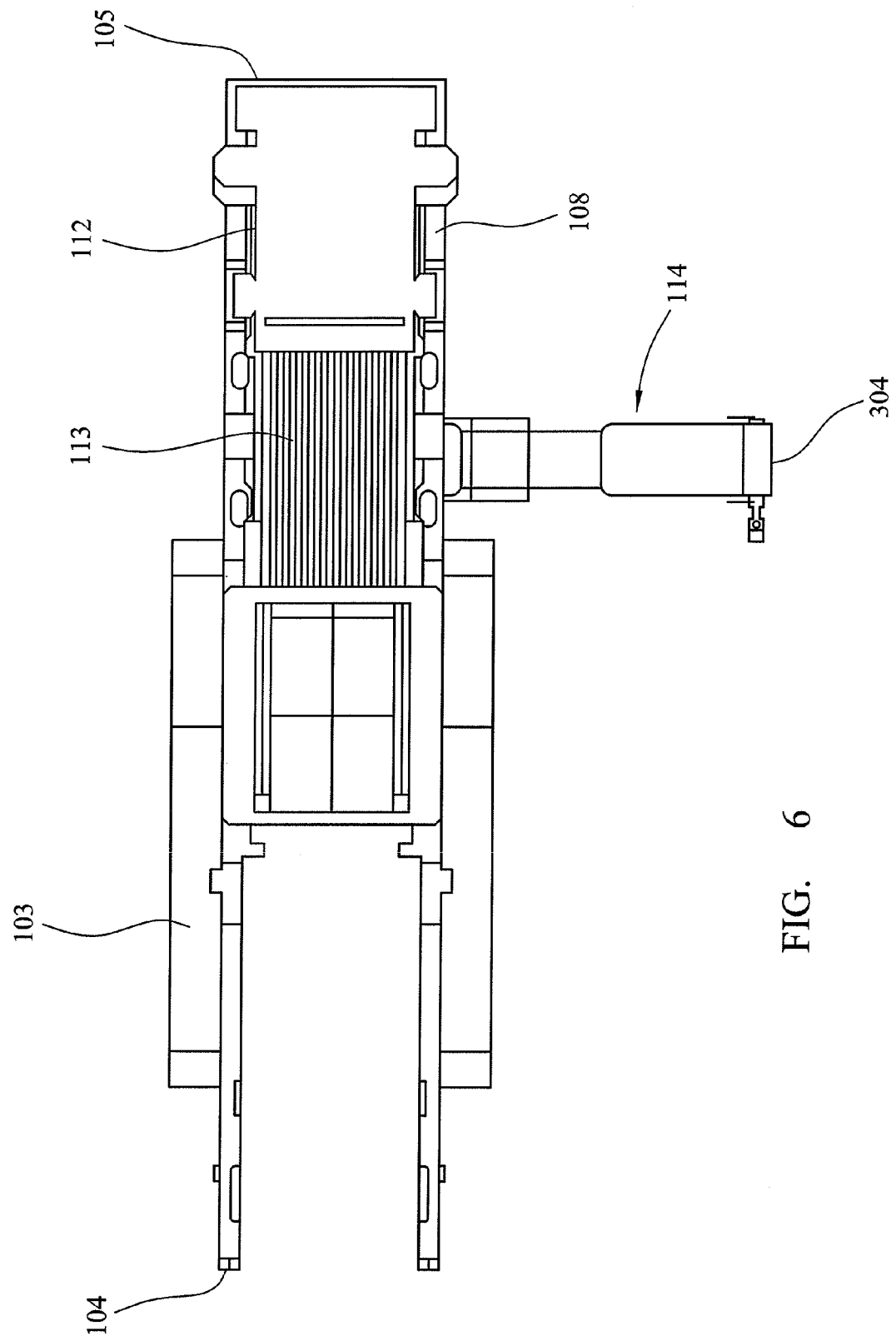
FIG. 6 is a plan view of the plant of FIG. 2 with the discharge conveyor slewed through 90° to extend laterally to the side of the plant at a rearwardmost position of the main frame.

As conveyor 114 is suspended from beams 108 via first and second brackets 203, 309 (pivotally coupled to one another via slew ring 202) the tail 302 and head 303 sections are capable of slewing through 180° between the extreme side positions (the right side position being illustrated in FIG. 6) where conveyor 114 projects laterally to one side of, and being aligned perpendicular to, the longitudinally extending frame 102. In the configuration of FIG. 6, conveyor 114 is configured to stockpile discharged material to a plurality of different positions at either side of frame 102 and beyond the plant forward end 105.

Figure 7:
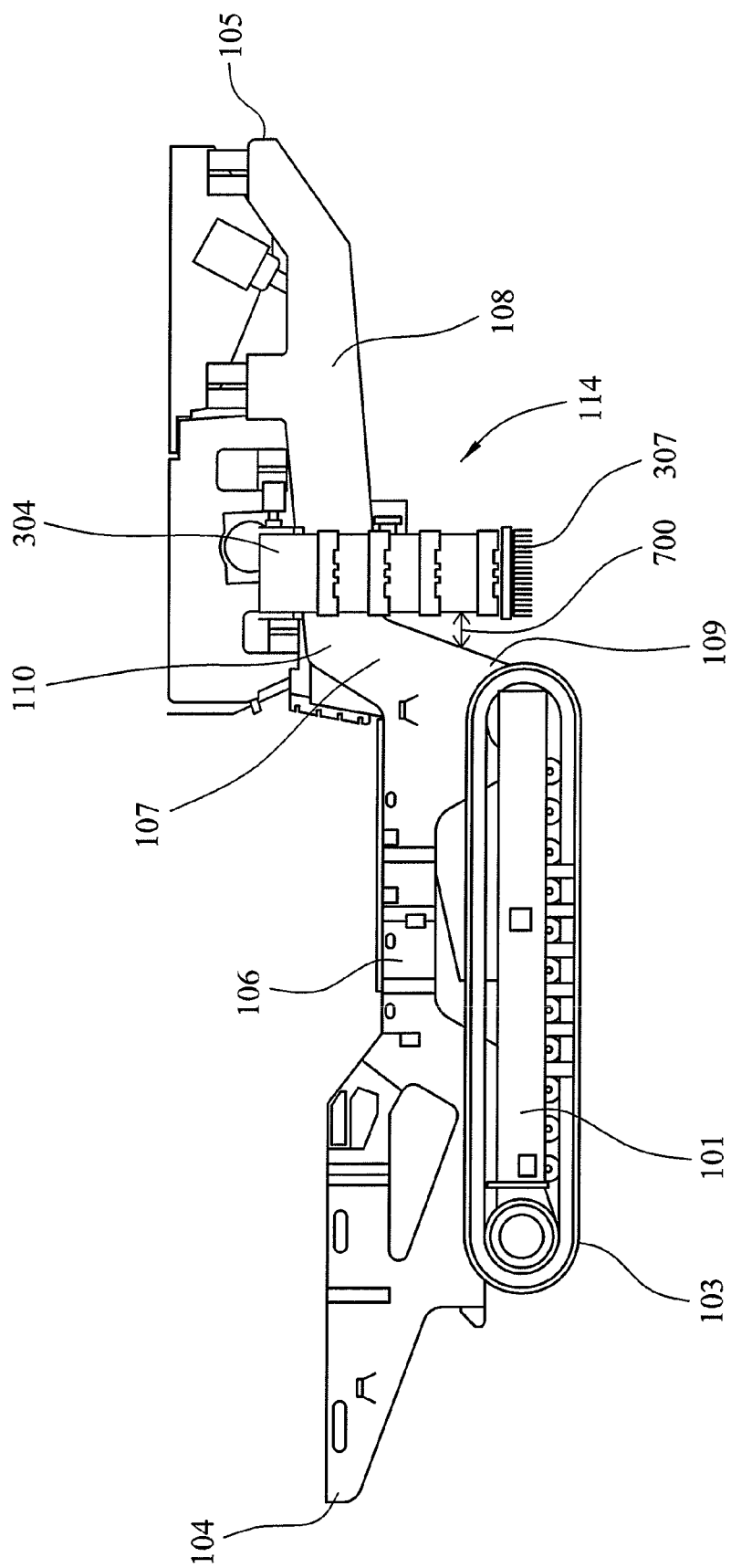
FIG. 7 is a side view of the plant of FIG. 6 with the discharge conveyor slewed through 90° to extend laterally to the side of the plant at the rearwardmost position of the main frame.
Figure 8:
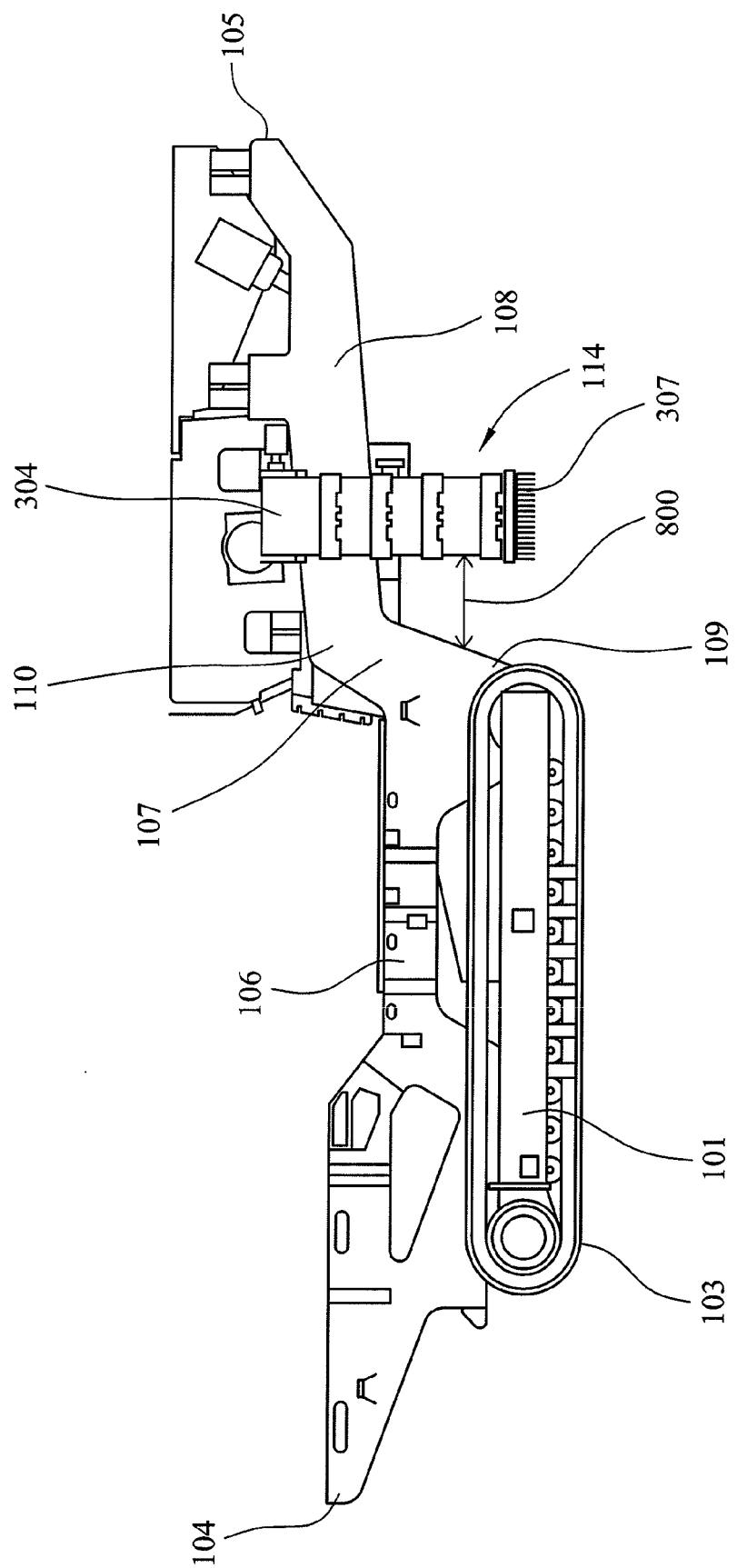
FIG. 8 is a further side view of the plant of FIG. 7 with the discharge conveyor moved in the longitudinal axis direction away from a central region to a forwardmost position at the main frame.

Referring to FIGS. 7 and 8, via sliding movement of runners 310 along rails 500, the entire conveyor assembly 114 is capable of being linearly displaced towards and away from neck section 107. FIG. 7 illustrates the general operative position of conveyor 114 separated from neck 107 by a relatively short linear distance 700. FIG. 8 illustrates conveyor 114 displaced forwardly towards end 105 and away from neck 107 so as to provide a relatively greater separation distance 800 between conveyor 114 and neck section 107. This is advantageous to provide repair or maintenance access to this region of plant 100.

Figure 9:
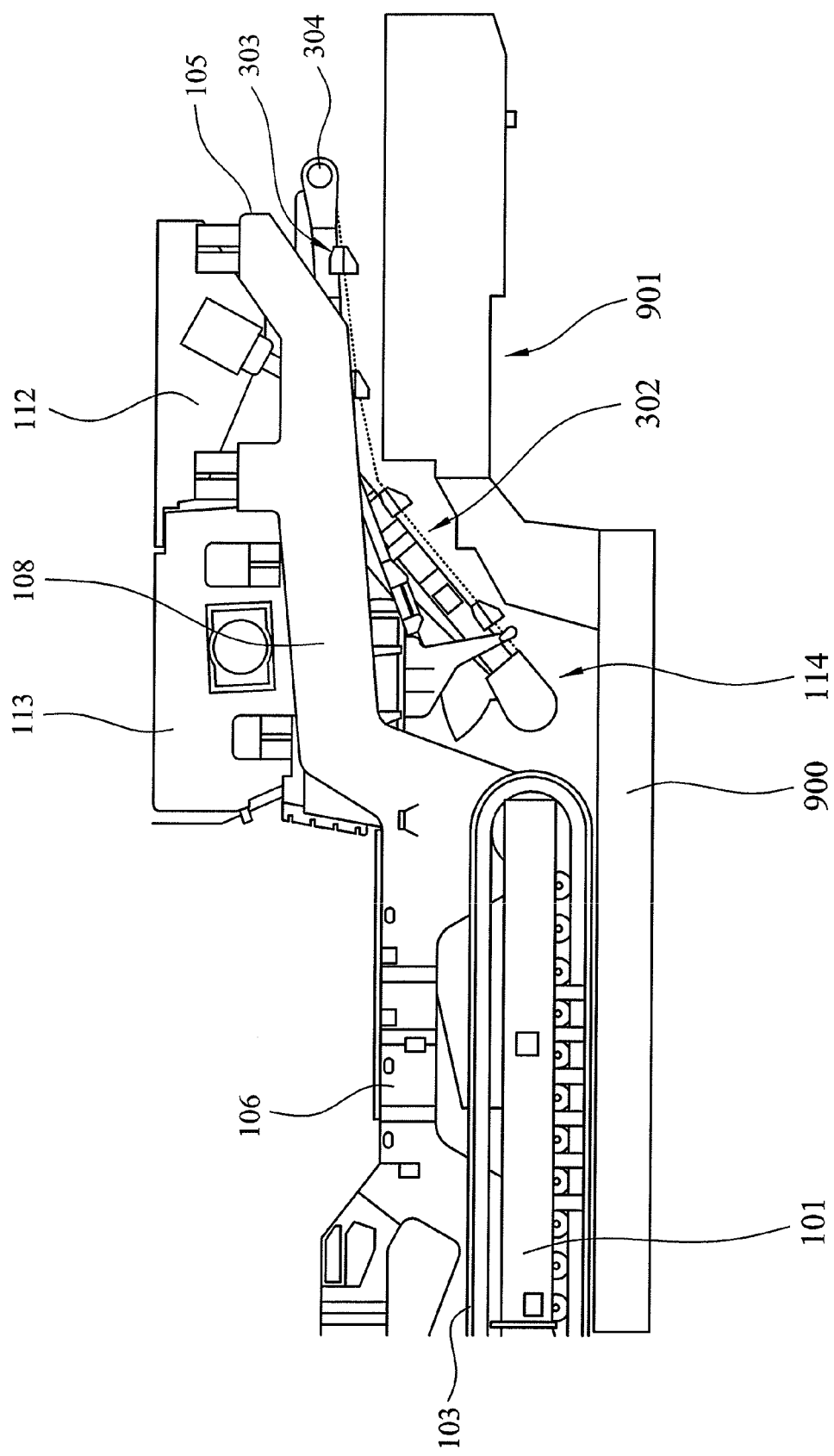
FIG. 9 is a side elevation view of the plant of FIG. 1 with the conveyor positioned or stowed between a region of the main frame for loading and transport upon a low-loading trailer.

Advantageously, the space 200 between beams 108 is configured to receive and accommodate at least the head section 303 of conveyor 114 in a transport or stowed position. That is, the lateral sides 207 of head section 303 in the transport configuration of FIGS. 1 and 9 are positioned opposed to the inward facing surfaces 206 of beams 108. Accordingly, the head section 303 is almost completely accommodated within space 200 between the opposed beams 108. Cross beam 201 is positioned at an uppermost region of beams 108 such that the conveyor distal end 304 is positioned below beam 201 and does not obstruct the encapsulation of head section 303 between the frame beams 108. According to the specific implementation, conveyor end 304 projects forwardly from beam end 105. To manipulate conveyor 114 from the transport position of FIGS. 1 and 9 to the operative positions of FIGS. 6 to 8, hydraulic rams 305, 306 are actuated to lower the head and tail sections 303, 302 such that conveyor frame 301 and belt 300 are lowered vertically below beams 108. Head and tail sections 303, 302 may then be slewed through 90° to the left or right via pivot joint 115. As illustrated in FIG. 9, the encapsulation of a least the head section 303 within plant frame 102 allows the plant 100 to be conveniently installed on a low-loader trailer 900 with the forwardmost end 105 positioned vertically above the raised articulating section 901 of the low loader. This is to be contrasted with conventional plant arrangements where the entire plant must be loaded onto trailer 900 in the opposite rearward direction. Accordingly, conveyor 114 is both protected by the transport vehicle and by the beams 108 during transport.

Additionally, by suspending the entire conveyor 114 below the beams 108, the clearance of guard 307 above the ground can be maximised to facilitate manoeuvrability of the plant 100 over rough terrain. Additionally, suspending conveyor 114 from frame 102 enables the linear sliding actuation of the conveyor assembly 114 (as illustrated in FIGS. 7 and 8) to provide maintenance access to otherwise obstructed regions of the plant 100.

The invention claimed is:

1. A mobile bulk material processing apparatus comprising:
   a longitudinally extending main frame having a first end and a second end, the main frame including a base region for mounting a pair of endless tracks or wheels to allow the apparatus to move over the ground, a neck section extending upwardly from the base region, and a pair of spaced apart opposed beams projecting towards the first end from an uppermost part of the neck section;
   a conveyor to transport material from or to a material processing unit mounted at the main frame; and
   at least one coupling to mount the conveyor at the main frame for movement between a raised transport position and a lowered operative position, such that at least a part of the conveyor is accommodated between the beams substantially at the first end when in the raised transport position.

2. The apparatus as claimed in claim 1, further comprising at least one cross beam or brace extending between and linking the opposed beams in a widthwise direction of the apparatus.

3. The apparatus as claimed in claim 1, wherein the at least one coupling includes a pivot joint to allow the conveyor to pivot relative to the main frame to change a position of a distal end of the conveyor relative to the main frame.

4. The apparatus as claimed in claim 3, wherein the pivot joint is mounted and suspended below the opposed beams.

5. The apparatus as claimed in claim 3, further comprising a first bracket to couple the pivot joint to the main frame and a second bracket to couple the pivot joint to the conveyor such that the second bracket is configured to pivot relative to the first bracket.

6. The apparatus as claimed in claim 1, wherein the conveyor includes a head and tail section pivotally mounted together to allow the head section to bend or fold relative to the tail section to raise and lower a distal end of the conveyor relative to the opposed beams.

7. The apparatus as claimed in claim 6, wherein the head section is positionable between the opposed beams when the conveyor is raised to the transport position.

8. The apparatus as claimed in claim 6, further comprising a plurality of power operated linear actuators to drive bending or folding of the head section relative to the tail section.

9. The apparatus as claimed in claim 3, wherein the conveyor includes a support structure to mount an endless belt or carriage member configured to support and transport the material relative to the main frame, wherein the pivot joint is mounted between the belt or carriage member and the opposed beams in a substantially vertical direction.

10. The apparatus as claimed in claim 1, wherein a distal end of the conveyor is arranged to project longitudinally from between the beams beyond the first end of the main frame.

11. The apparatus as claimed in claim 1, further comprising a screening unit mounted at the main frame to process material and to feed at least some of the processed material to the conveyor.

12. The apparatus as claimed in claim 1, wherein the material processing unit includes a crusher mounted at the base region of the main frame.

* * * * *